United States Patent
Ho et al.

(10) Patent No.: US 7,869,493 B2
(45) Date of Patent: Jan. 11, 2011

(54) METHOD FOR DETECTING A SIGNAL, DETECTOR AND COMPUTER PROGRAM PRODUCT

(75) Inventors: Chin Keong Ho, Singapore (SG); Yan Wu, Singapore (SG); Sumei Sun, Singapore (SG); Zhongding Lei, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 48 days.

(21) Appl. No.: 11/573,138

(22) PCT Filed: Aug. 3, 2005

(86) PCT No.: PCT/SG2005/000265

§ 371 (c)(1),
(2), (4) Date: Dec. 3, 2008

(87) PCT Pub. No.: WO2006/014142

PCT Pub. Date: Feb. 9, 2006

(65) Prior Publication Data

US 2009/0232261 A1    Sep. 17, 2009

(51) Int. Cl.
H03H 7/30 (2006.01)
H03H 7/40 (2006.01)
H03K 5/159 (2006.01)

(52) U.S. Cl. .................. 375/229; 375/232; 375/240.26; 375/240.29

(58) Field of Classification Search ......... 375/229–234, 375/240.26–240.29, 341–343, 350
See application file for complete search history.

(56) References Cited

U.S. PATENT DOCUMENTS

| 4,388,724 A | 6/1983 | Göckler |
| 6,301,293 B1 | 10/2001 | Huang et al. |
| 6,549,544 B1 * | 4/2003 | Kroeger et al. ............... 370/482 |
| 7,315,530 B2 * | 1/2008 | Castelain et al. ............ 370/335 |
| 7,336,636 B2 * | 2/2008 | Salzer ........................ 370/335 |
| 2001/0007579 A1 * | 7/2001 | Chouly ........................ 375/285 |

(Continued)

FOREIGN PATENT DOCUMENTS

EP    0715407    2/1992

(Continued)

OTHER PUBLICATIONS

Z. Lei, Y. Wu, C.K. Ho, S. Sun, P. He, and Y. Li, "Iterative detection for Walsh-Hadamard Transformed OFDM," in Proc. 57th *IEEE Vehicular Technology Conference.*, Jeju, Korea, Apr. 2003, pp. 637-640.

*Primary Examiner*—David C Payne
*Assistant Examiner*—Linda Wong
(74) *Attorney, Agent, or Firm*—K. David Crokett, Esq.; Niky Economy Syrengelas, Esq.; Crokett & Crokett, PC

(57) ABSTRACT

A method for detecting a signal received via a communication channel, the communication channel being affected by noise, is described, wherein the received signal is processed according to a filtering step (202), the filtering step comprises multiplication of at least one component of the received signal with a filter coefficient and the filter coefficient comprises a noise variance offset which corresponds to the variance of the noise.

3 Claims, 3 Drawing Sheets

U.S. PATENT DOCUMENTS

| | | |
|---|---|---|
| 2002/0191720 A1 | 12/2002 | Neubauer |
| 2003/0133404 A1* | 7/2003 | Castelain et al. ............ 370/203 |
| 2003/0137928 A1* | 7/2003 | Kroeger et al. ............. 370/206 |
| 2004/0062302 A1 | 4/2004 | Fujii et al. |
| 2004/0240587 A1* | 12/2004 | Ozen .......................... 375/340 |

FOREIGN PATENT DOCUMENTS

| | | |
|---|---|---|
| EP | 0580482 | 7/1993 |
| EP | 0955727 | 4/1999 |
| EP | 0525456 | 11/2000 |
| JP | 10294711 | 4/1997 |
| JP | 2000115028 | 4/2000 |
| JP | 2004166218 | 6/2004 |
| WO | WO00/41338 | 12/1999 |
| WO | WO00/65792 | 11/2000 |
| WO | WO2004/032347 | 8/2002 |
| WO | WO2004038984 | 5/2004 |

* cited by examiner

METHOD FOR DETECTING A SIGNAL, DETECTOR AND COMPUTER PROGRAM PRODUCT

FIELD OF THE INVENTION

The invention relates to a method for detecting a signal, a detector and a computer program product.

BACKGROUND OF THE INVENTION

In mobile communications, high user capacities and high data rates are desirable. To achieve this, mobile radio systems have to be highly spectral efficient. Using multicarrier modulation according to OFDM (orthogonal frequency division multiplexing) robust performance and high spectral efficiency can be achieved.

Before the OFDM modulation, a pre-transform can be carried out, resulting in a so-called PT-OFDM (pre-transform OFDM) system.

In [1] (and also in [2]), an iterative detection algorithm for a PT-OFDM system is described. This will be described in the following.

An iteration (corresponding to an iteration index i) of the iterative detection algorithm corresponds to three stages, a reconstruction step, a linear filtering step and a decision step.

In the ith reconstruction step, i.e. in the reconstruction step of the iteration corresponding to the iteration index i, the $m_i$th component of the received signal r (received signal vector) is estimated. This is done by using the previously detected symbol $\hat{\underline{x}}_{i-1}$ (i.e. the signal vector detected in the previous iteration). $m_i$ corresponds to the frequency domain channel with the ith smallest amplitude. In the filtering step, the cross interference of the data is removed by a linear filter denoted by G. In the detection step, a tentative (hard or soft) decision (denoted by dec(.)) is made to generate the symbol detected in the ith iteration, $\hat{\underline{x}}_i$.

The algorithm is initialized with $\underline{r}_0=\underline{r}$, $\tilde{\underline{x}}=G\underline{r}_0$ and $\hat{\underline{x}}_0=\text{dec}(\tilde{\underline{x}}_0)$.

The ith iteration is given by:

$$\underline{r}_i = \underline{1}_{m_i}\underline{r}_{i-1} + \underline{0}_{m_i}\Gamma W \hat{\underline{x}}_{i-1}$$

$$\tilde{\underline{x}}_i = G\underline{r}_i$$

$$\hat{\underline{x}}_i = \text{dec}(\tilde{\underline{x}}_i)$$

where $0_m$ is defined as a diagonal matrix with value 1 on its mth diagonal term and 0 otherwise, and $1_m$ as a diagonal matrix with value 0 on its mth diagonal term and 1 otherwise.

In [1], the filter used in the iterative detection algorithm is based on the least squares criteria, also known as zero forcing (ZF) filter. Improvement is marginal even when a filter based on standard minimum mean squared error (MMSE) is used.

An object of the invention is to increase the performance of existing detecting methods.

The object is achieved by a method for detecting a signal, a detector and a computer program product with the features according to the independent claims.

SUMMARY OF THE INVENTION

A method for detecting a signal received via a communication channel is provided, wherein the communication channel is affected by noise, wherein the received signal is processed according to a filtering step, the filtering step comprises multiplication of at least one component of the received signal with a filter coefficient and the filter coefficient comprises a noise variance offset which corresponds to the variance of the noise.

Further, a detector and a computer program product according to the method for detecting a signal described above are provided.

SHORT DESCRIPTION OF THE FIGURES

DETAILED DESCRIPTION

Illustratively, a filter is used for reconstructing the received signal which has the noise variance of the channel as additional input and which processes the received signal in dependence of the magnitude of the variance of the noise that affects the channel. At least one filter coefficients of the filter is modified by an offset made up by the noise variance. This means that at least one filter coefficient is a term that comprises the noise variance as summand.

Especially in cases of high SNR (signal to noise ratio), using the invention, a performance gain in terms of BER (bit error rate) with respect to prior art methods can be achieved.

Embodiments of the invention arise form the dependent claims. Embodiments of the invention which are described in the context of the method for detecting a signal are analogously valid for the detector and the computer program product.

In one embodiment, the received signal is grouped into a plurality of blocks.

The processing of the received signal according to the filtering step may corresponds to the multiplication of a block of the received signal with a filtering matrix.

The filtering matrix may correspond to a product of matrices, wherein one of the matrices is a channel coefficient matrix that comprises components which are terms of channel coefficients that specify the transmission characteristics of the channel.

A channel coefficient is typically denoted by h and specifies the impulse responses of the channel, for example in the frequency domain.

In one embodiment, at least one of the components of the channel coefficient matrix is a term of a channel coefficient and the variance of the noise. In another embodiment, a plurality of the components of the channel coefficient matrix are terms of a channel coefficient and the variance of the noise.

For example, at least one of the components of the channel coefficient matrix is the conjugate of a channel coefficient divided by the sum of the square of the absolute value of the channel coefficient and the noise variance.

At least one of the components of the channel coefficient matrix can be the inverse of a channel coefficient.

In one embodiment, the variance of the noise of the channel is determined.

The invention can for example be used in communication systems according to WLAN 11a, WLAN 11g, WLAN 11n, Super 3G, HIPERLAN 2 and WIMAX (Worldwide Interoperability for Microwave Access) and B3G (beyond 3G).

Figure 1:
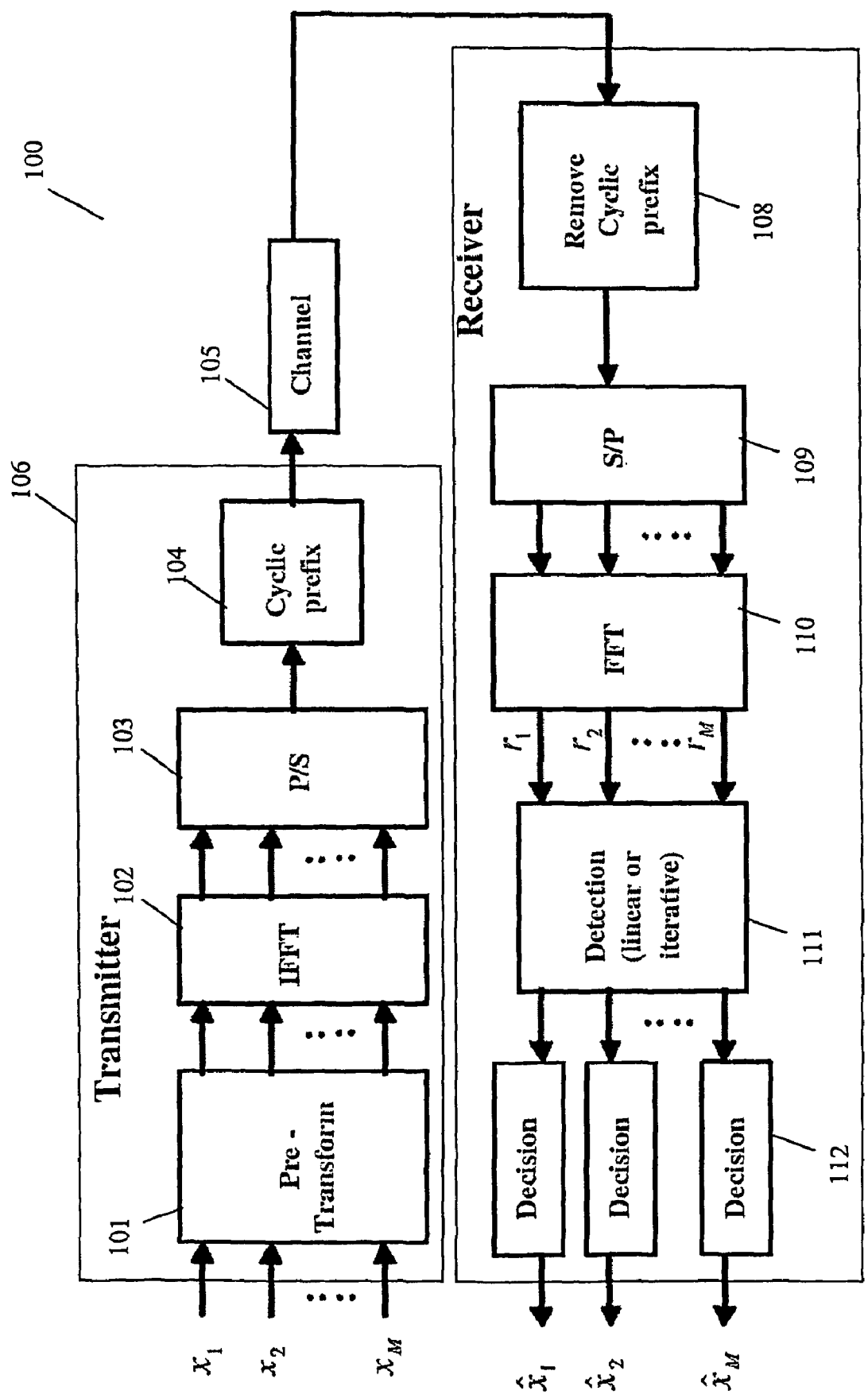
FIG. 1 shows a transmitter/receiver system 100 according to an embodiment of the invention.

FIG. 1 shows a transmitter/receiver system 100 according to an embodiment of the invention.

The transmitter/receiver system 100 is formed according to a PT-OFDM (Pre-Transform Orthogonal Frequency Division Multiplexing) system. For simplicity it is assumed that $M=2^k$, e.g. $M=32$, and that M information symbols $x_m$, $m=1, 2, \ldots, M$ are transmitted at the same time in form of one OFDM symbol. For transmitting these information symbols, the vector of information symbols, $\underline{x}=[x_1, x_2, \ldots, x_m]^T$, in the following also called the original signal vector, is fed to a pre-transform unit 101. The superscript T denotes the transpose operator.

The pre-transform unit 101 calculates a vector of modulation symbols $\underline{s}=[s_1, s_2, \ldots, s_M]^T$ for the original signal vector according to $$\underline{s}=\underline{W}\cdot\underline{x}.$$

$\underline{W}$ represents a PT (pre-transform) matrix of size M×M. There is no loss of code rate in terms of number of information symbols transmitted per channel use. In the case of an OFDM system, the matrix $\underline{W}$ would simply be an identity matrix.

The vector (or block) of modulation symbols $\underline{s}$ generated by the pre-transform unit 101 is then passed to an IFFT (inverse fast Fourier transform) unit 102 which carries out an inverse fast Fourier transform on the block of modulation symbols.

The inverse fast Fourier transform is used in this embodiment as an efficient realization of an inverse Fourier transform. Other domain transformations can be used instead of the inverse fast Fourier transform, for example an inverse discrete sine transform or an inverse discrete cosine transform.

The vector generated by the IFFT unit 102 is then mapped from parallel to serial, i.e. to a sequence of signal values, by a P/S (parallel to serial) unit 103. A cyclic prefix unit 104 inserts a cyclic prefix into the sequence of signal values to form a PT-OFDM symbol which is transmitted via a channel 105.

The cyclic prefix that is inserted has a duration no shorter than the maximum channel delay spread. The channel 105 is assumed to be a quasi/static frequency selective Rayleigh fading channel corrupted by additive white Gaussian noise (AWGN).

The pre-transform unit 101, the P/S unit 102 and the cyclic prefix unit 104 are part of a transmitter 106.

The PT-OFDM symbol is received by a receiver 107. A cyclic prefix removal unit 108 removes the cyclic prefix from the PT-OFDM symbol. The resulting sequence of signal values is mapped from parallel to serial by a S/P unit 109 and is domain transformed according to a fast Fourier transform by an FFT (fast Fourier transform) unit 110. Analogously to the IFFT unit 102, the FFT unit 110 can in other embodiments also be adapted to perform a discrete sine transform or a discrete cosine transform or another domain transformation.

The output vector of the FFT unit 110 is denoted by $\underline{r}=[r_1, r_2, \ldots, r_m]^T$ and can be written as $$\underline{r}=\underline{\Gamma}\cdot\underline{s}+\underline{n}=\underline{\Gamma}\cdot\underline{W}\cdot\underline{x}+\underline{n}$$

where $\underline{\Gamma}=\text{diag}(h_1, h_2, \ldots, h_M)$ is a diagonal matrix with diagonal elements $h_1, \ldots, h_M$ which are the frequency domain channel coefficients and $\underline{n}$ is the AWGN vector of dimension M×1. The frequency domain channel coefficients are given by $h_m=\Sigma_n \tilde{h}_n \exp(-j2\pi n(m-1)/M)$, $m=1, 2, \ldots, M$, assuming a sampled spaced Lth order FIR (finite input response) channel model $\{\tilde{h}_n\}_{n=0}^L$.

The output vector $\underline{r}$ of the FFT unit 110 is fed to a detection unit 111. The detection unit 111 performs an iterative detection algorithm. An iteration (corresponding to an iteration index i) of the iterative detection algorithm corresponds to three stages, a reconstruction step, a linear filtering step and a decision step.

In the ith reconstruction step, i.e. in the reconstruction step of the iteration corresponding to the iteration index i, the $m_i$th component of the vector r is estimated. This is done by using the previously detected symbol $\hat{\underline{x}}_{i-1}$ (i.e. the signal vector detected in the previous iteration). $m_i$ corresponds to the frequency domain channel with the ith smallest amplitude. In the filtering step, the cross interference of the data is removed by a linear filter denoted by G. In the detection step, a tentative (hard or soft) decision (denoted by dec(.)) is made to generate the symbol detected in the ith iteration, $\hat{\underline{x}}_i$. When the last iteration has been performed (e.g. after a given number of iterations, e.g. 4, has been performed) the detected symbols $\hat{\underline{x}}_i$ are output by decision units 112.

The algorithm is initialized with $\underline{r}_0=\underline{r}$, $\tilde{\underline{x}}=\underline{G}\underline{r}_0$ and $\hat{\underline{x}}_0=\text{dec}(\tilde{\underline{x}}_0)$.

The ith iteration is given by:

$$\underline{r}_i=\underline{1}_{m_i}\underline{r}_{i-1}+\underline{0}_{m_i}\underline{\Gamma}\underline{W}\hat{\underline{x}}_{i-1}$$

$$\tilde{\underline{x}}_i=\underline{G}\underline{r}_i$$

$$\hat{\underline{x}}_i=\text{dec}(\tilde{\underline{x}}_i)$$

where $\underline{0}_m$ is defined as a diagonal matrix with value 1 on its mth diagonal term and 0 otherwise, and $\underline{1}_m$ as a diagonal matrix with value 0 on its mth diagonal term and 1 otherwise.

Under the assumption that the variance of the noise corrupting the channel 105 is known, the MMSE (minimum mean square error) filter described in the following can be used by the detection unit 111 to improve the performance of the transmitter/receiver system 100.

Taking into account the MMSE criteria and assuming that previous detected symbols are correct for each reconstruction, the linear filter for the ith ($i=1, 2, \ldots, M$) iteration can be derived:

$$\begin{aligned}\underline{G} &= \underline{W}^{-1}\cdot\underline{B}\\ &= \underline{W}^{-1}\cdot\text{diag}(\beta_1, \beta_2, \ldots, \beta_M)\end{aligned}$$

where $$\beta_m = \begin{cases} h_m^{-1}, & \text{where } m=\{m_n, n=1, \ldots, i\}\\ h_m^*/(|h_m|^2+\sigma^2), & \text{otherwise}\end{cases}$$

and $\sigma^2$ is the noise variance. This $\underline{G}$ is used in the filtering step of the reconstruction algorithm carried out by the detection unit 111 as described above.

For the initial iteration of the reconstruction algorithm, the MMSE filter with $$\beta_m=h_m^*/(|h_m|^2+\sigma^2), m=1, \ldots, M.$$

is used.

When the matrix $\underline{W}$ is chosen as unitary and has constant amplitude elements, even when the MMSE filter is used, the choice of $m_i$ is unchanged (corresponding to the frequency domain channel with the ith smallest amplitude). That is, this choice still maximizes the worse post-filtered SNR at every detection step under the assumption that the previous detection is correct.

Simulations show that using this filter, the error floor can be reduced and superior performance can be achieved for high SNR. Note that this MMSE filter requires the knowledge that the noise variance is known at the receiver. However, simulations show that it is robust to noise variance errors.

In one embodiment, the reconstruction is extended as will be described with reference to FIG. 2 and FIG. 3.

Figure 2:
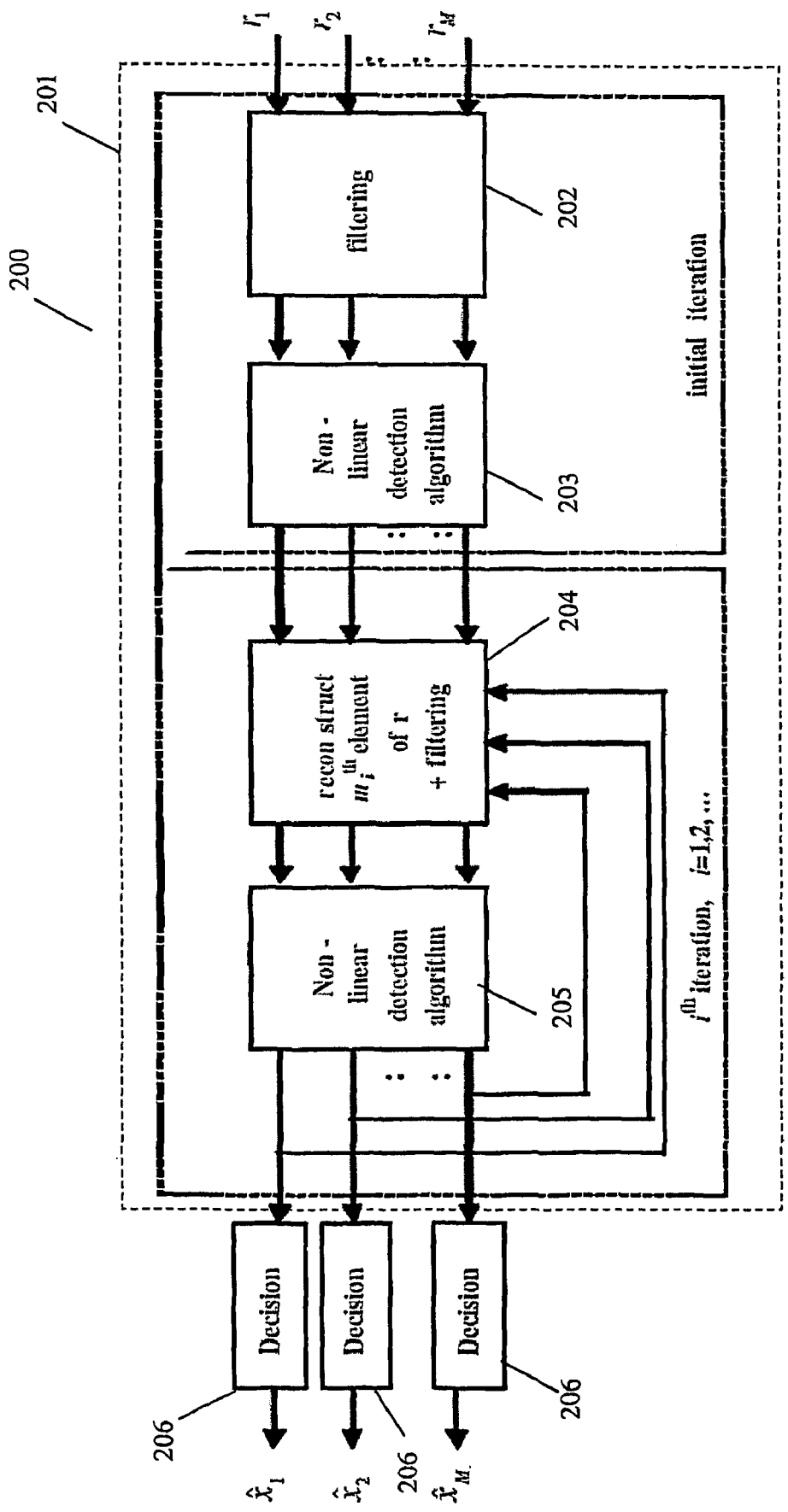
FIG. 2 shows a receiver 200 according to an embodiment of the invention.

FIG. 2 shows a receiver 200 according to an embodiment of the invention.

The receiver 200 may be used instead of the receiver 107 shown in FIG. 1 in the transmitter/receiver system 100. The receiver 200 comprises a detection unit 201 and, corresponding to the decision units 112 of the receiver 107 shown in FIG. 1, decision units 206. Analogously to the receiver 107, the receiver 200 comprises other functional units, for example an FFT unit, which are not shown in FIG. 2.

Analogously to the detection unit 111, a vector $\underline{r}$, e.g. the output vector of an FFT unit performing an FFT, is fed to the detection unit 201.

A filtering unit 202 of the receiver 201 performs a filtering step of a reconstruction algorithm, e.g. the initial filtering step of the reconstruction algorithm described above. The result of the filtering step, denoted by $\underline{\tilde{x}}_0$ in accordance to the above description of the reconstruction algorithm is supplied to a first nonlinear detection unit 203.

The receiver further comprises a second nonlinear detection algorithm unit 205. The structure of the first nonlinear detection unit 203 and the second nonlinear detection unit 205 are described in the following with reference to FIG. 3.

Figure 3:
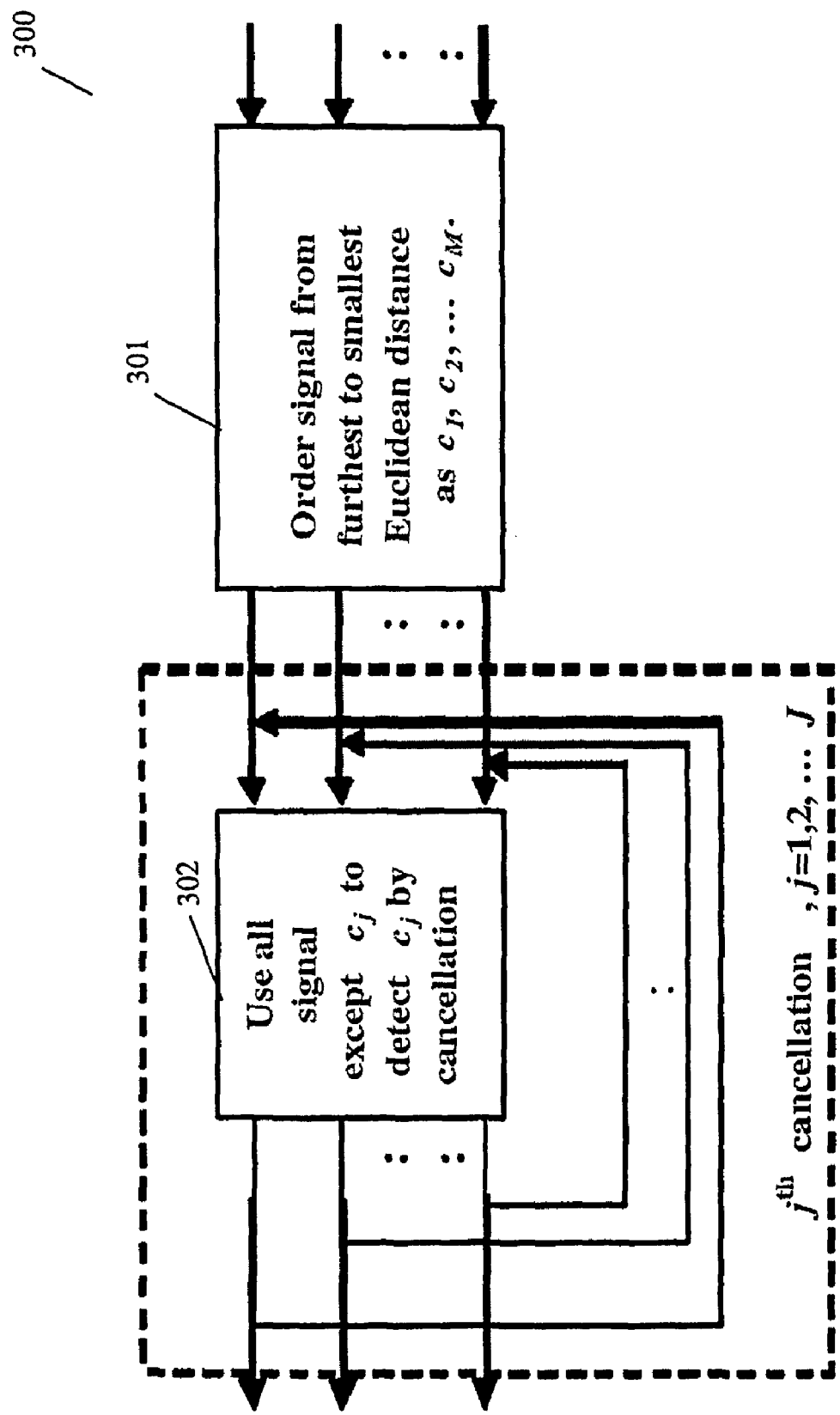
FIG. 3 shows a nonlinear detection unit according to an embodiment of the invention.

FIG. 3 shows a nonlinear detection unit 300 according to an embodiment of the invention.

The nonlinear detection unit performs an ordered interference cancellation algorithm as will be described in the following.

The input vector of the non-linear detection unit 300 is a soft estimate of a transmitted signal (in case of the first non-linear detection unit, this is the output $\underline{\tilde{x}}_0$ of the filtering unit 202). The input vector of the non-linear detection unit 300 is fed to an ordering unit 301.

The ordering unit 301 performs an ordering step by obtaining the minimum Euclidean distance of the input to any point of the signal constellation. Then, the components of the input vector are ordered from largest to smallest (minimal) Euclidean distance and a hard decision is performed on the components of the input vector to form $c_1, c_2, \ldots, c_M$.

$c_1, c_2, \ldots, c_M$ are fed to a cancellation unit 302 which performs the following algorithm:

For interference cancellation $j=1, \ldots, J$, (i) use $\{c_k\}_{k \neq j}$ to cancel from reconstructed received signal $\underline{r}_i$ to obtain a soft estimate of $c_j$ (ii) perform hard decision on the soft estimate and update the newly detected $c_j$ (iii) increment j and continue with (i)

J is the number of cancellation steps and is for example chosen equal to M.

Illustratively, the interference cancellation algorithm uses the "best" components of the estimate, in the sense that they have minimal Euclidean distance to the signal constellation to improve the "worse" components, which have a higher Euclidean distance to the signal constellation.

The output of the first cancellation unit 302 is fed to the reconstruction unit 204. The reconstruction unit 204 performs the reconstruction step and the filtering step for the ith iteration (where i=1, 2, . . . ) according to the reconstruction algorithm described above.

The result of each iteration performed by the reconstruction unit 204 is fed to the second non-linear detection unit 205. The output of the second non-linear detection unit 205 is fed back to the reconstruction unit 204 for the next iteration to be performed except for the last iteration, when the output is supplied to the decision units 206 which generate the output of the receiver 200.

The receiver 200 can also be used with a pre-transform (according to a matrix $\underline{W}$) according to prior art and with a filter (according to a matrix $\underline{G}$) according to prior art. This means that the idea of ordering the signal values according to a distance measure and using the signal values which are best (in terms of smallest distance) to cancel the interference from the other signal values is independent from using a pre-transformation matrix and from using a filter which is dependent on the variance of the noise of the channel used for data transmission.

In the above, the following documents are cited:

[1] Receiver Having a Signal Reconstructing Section for Noise Reduction, System and Method Thereof, International Application Number: PCT/SG02/00194

[2] Z. Lei, Y. Wu, C. K. Ho, S. Sun, P. He, and Y. Li, "Iterative detection for Walsh-Hadamard Transformed OFDM", in Proc. 57$^{th}$ IEEE Vehicular Technology Conf., Jeju, Korea, April 2003, pp. 637-640

The invention claimed is:

1. A method for detecting a signal received via a communication channel, the communication channel being affected by noise, wherein:

the received signal is grouped into a plurality of blocks and is processed according to a filtering step which corresponds to the multiplication of a block of the received signal with a filtering matrix, wherein the filtering matrix corresponds to a product of matrices, where one of the matrices is a channel coefficient matrix that comprises components which are terms of channel coefficients that specify the transmission characteristics of the chanel;

the filtering step comprises multiplication of at least one component of the received signal with a filter coefficient; and the filter coefficient comprises a noise variance offset which corresponds to the variance of the noise;

wherein at least one of the components of the channel coefficient matrix is a term of a channel coefficient and the variance of the noise;

wherein at least one of the components of the channel coefficient matrix is the conjugate of a channel coefficient divided by the sum of the square of the absolute value of the channel coefficient and square of the noise variance.

2. A method according to claim 1, wherein at least one of the components of the channel coefficient matrix is the inverse of a channel coefficient.

3. A method according to claim 1, wherein the variance of the noise of the channel is determined.

* * * * *

UNITED STATES PATENT AND TRADEMARK OFFICE
CERTIFICATE OF CORRECTION

PATENT NO. : 7,869,493 B2  Page 1 of 1
APPLICATION NO. : 11/573138
DATED : January 11, 2011
INVENTOR(S) : Chin Keong Ho et al.

It is certified that error appears in the above-identified patent and that said Letters Patent is hereby corrected as shown below:

Title Page, Item 74 should read as follows:

Attorney, Agent, or Firm: K. David "Crokett" --Crockett--, Esq.; Niky Economy Syrengelas, Esq.; "Crokett"--Crockett-- & Crockett, PC Signed and Sealed this
First Day of March, 2011

David J. Kappos
*Director of the United States Patent and Trademark Office*